(12) United States Patent
Yeh

(10) Patent No.: US 6,521,194 B2
(45) Date of Patent: Feb. 18, 2003

(54) OZONE-GENERATING FAUCET

(76) Inventor: Kuo-Chung Yeh, No. 149, Sec. 3, Lung Kang Road, Chung-Li City (TW)

(*) Notice: Subject to any disclaimer, the term of this patent is extended or adjusted under 35 U.S.C. 154(b) by 117 days.

(21) Appl. No.: 09/827,145

(22) Filed: Apr. 6, 2001

(65) Prior Publication Data

US 2002/0146357 A1 Oct. 10, 2002

(51) Int. Cl.$^7$ ................................. B01J 19/08
(52) U.S. Cl. ..................... 422/186.12; 210/760
(58) Field of Search ............... 422/186.12; 210/760

(56) References Cited

U.S. PATENT DOCUMENTS 6,135,146 A * 10/2000 Koganezawa et al. ...... 137/554

FOREIGN PATENT DOCUMENTS

| JP | 07 108284 A | * | 4/1995 |
| JP | 10 219786 A | * | 8/1998 |
| JP | 2001070770 A | * | 3/2001 |

* cited by examiner

*Primary Examiner*—Kishor Mayekar
(74) *Attorney, Agent, or Firm*—Troxell Law Office PLLC

(57) ABSTRACT

An ozone-generating faucet includes an ozone generator mounted on a mixer tube between a water supply tube and a spout, a water intake valve connected between the mixer tube and the water supply tube to control supply of water from the water supply tube to the mixer tube, an electromagnetic valve controlled to close/open the water intake valve, the ozone generator including an ozone-generating unit, a control circuit board, and an ozone supply tube connected between the ozone-generating unit and the mixer tube, the control circuit board being controlled by control switch to turn on the ozone generator and open the electromagnetic valve, enabling ozone to be supplied to water running through the mixer tube.

4 Claims, 6 Drawing Sheets

OZONE-GENERATING FAUCET

BACKGROUND OF THE INVENTION

The present invention relates to a faucet and, more particularly, to an ozone-generating faucet in which an ozone generator is mounted inside the shell of the faucet between the water supply pipe and the spout Following fast development of economics and technology, people concern about the quality and standard of living. In hospitals, schools, and other public places, ozone has been intensively used to purify the air, to kill bacteria, and to sterilize water. Regular ozone generators are commonly heavy and require much installation space. When used to sterilize water from a water supply source, an external piping must be installed to connect the ozone output port of the ozone generator to the supply pipe of the water source.

SUMMARY OF THE INVENTION

The present invention has been accomplished under the circumstances in view. It is the main object of the present invention to provide an ozone-generating faucet, which has an ozone generator installed inside the shell to automatically supply ozone to water when switched on by the user to output water.

DETAILED DESCRIPTION OF THE PREFERRED EMBODIMENT

Figure 1:
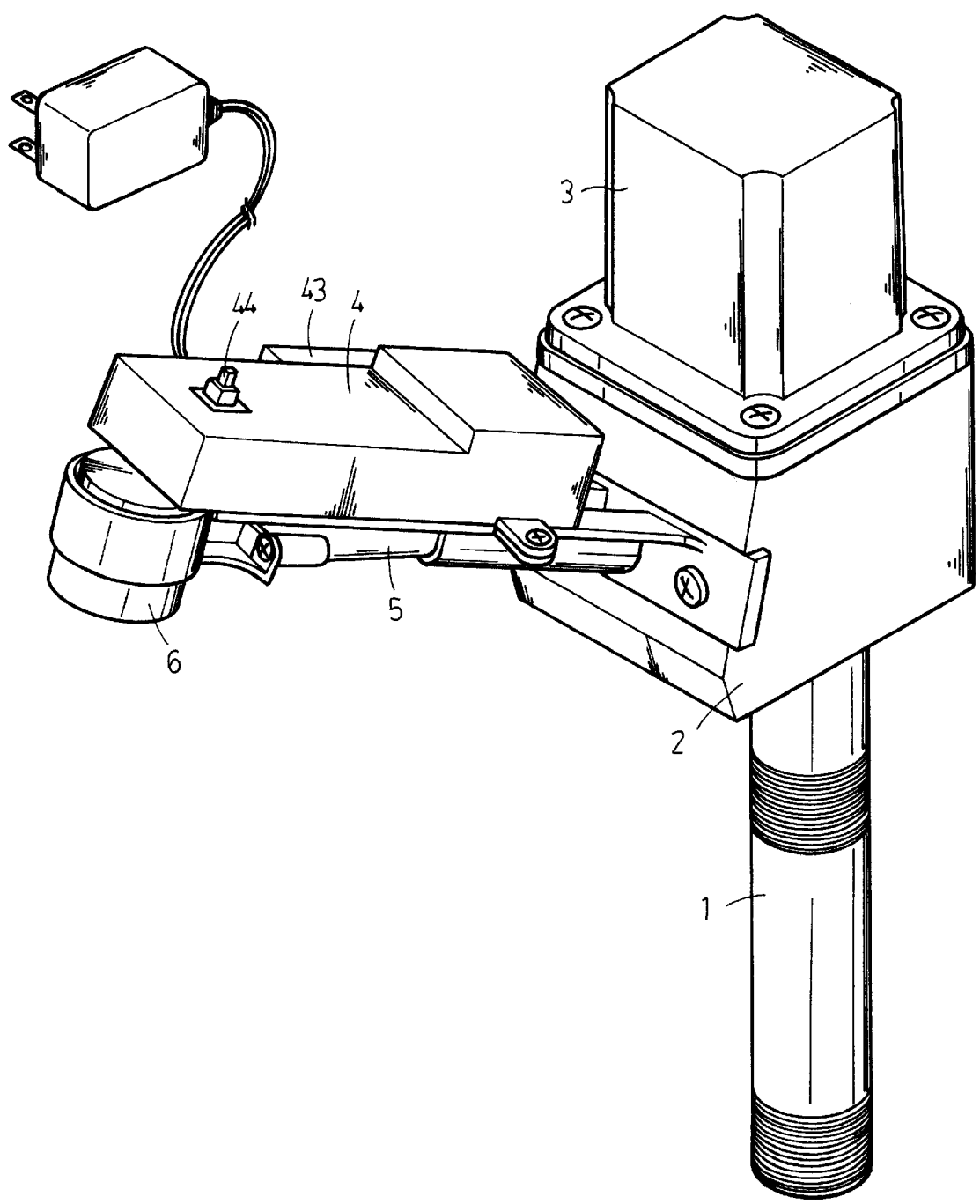
FIG. 1 is a perspective assembly view of an ozone-generating faucet according to the present invention.

Referring to FIGS. from 1 through 3, an ozone-generating faucet in accordance with the present invention is generally comprised of a water supply tube 1 connected to a water source (not shown), a water intake valve 2 connected to the top end of the water supply tube 1, an electromagnetic valve 3 mounted on the top side of the water intake valve 2, a mixer tube 5 extended from the water intake valve 2, an ozone generator 4 mounted on the mixer tube 5, and a spout 6 fastened to the front end of the mixer tube 5 remote from the water intake valve 2. Because the ozone generator 4 is mounted on the mixer tube 5, the installation of the ozone generator 4 requires no wall space.

Figure 2:
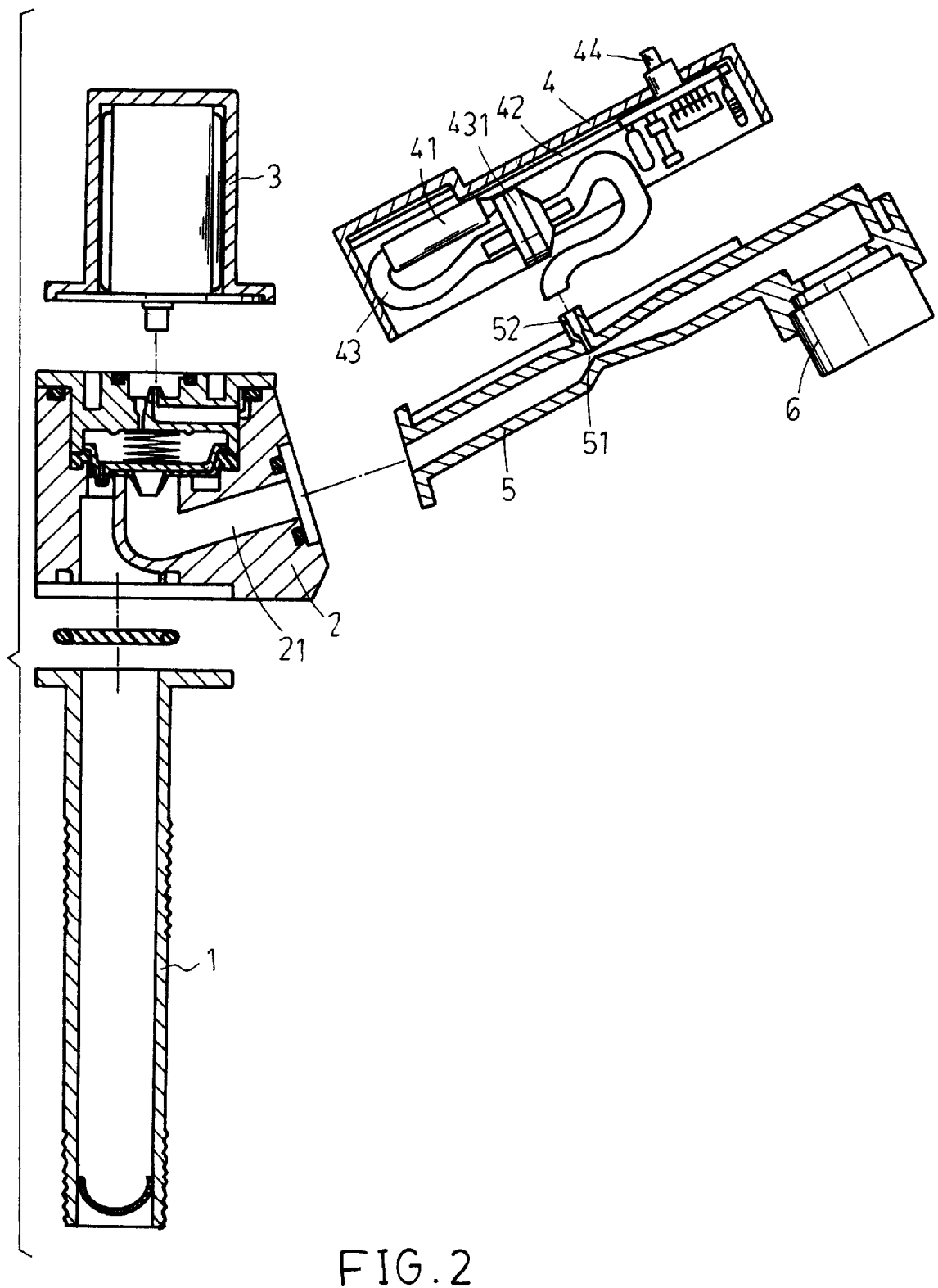
FIG. 2 is an exploded view in section of the present invention.
Figure 3:
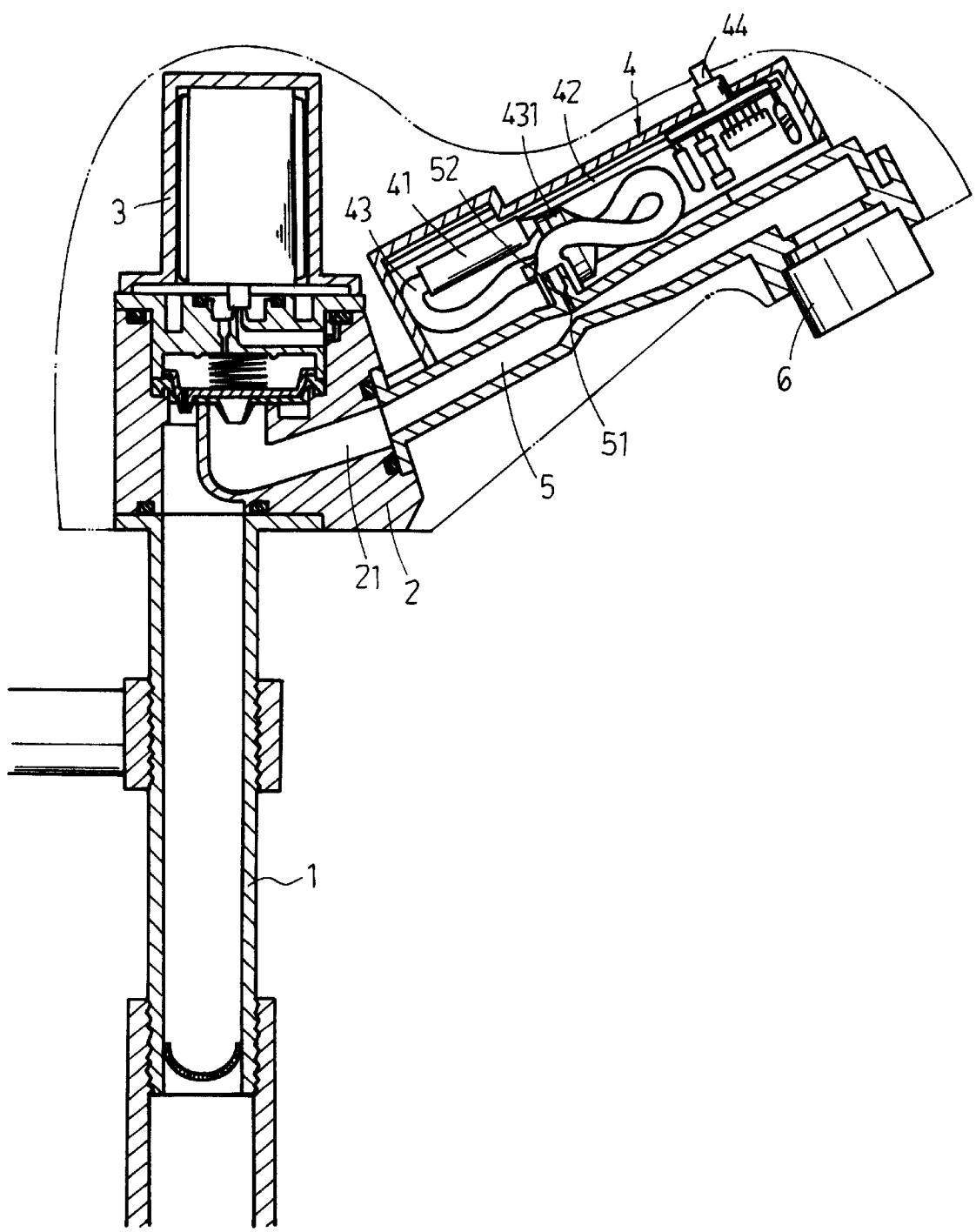
FIG. 3 is a sectional assembly view of the present invention.

Referring to FIGS. 2 and 3, the ozone generator 4 comprises an ozone-generating unit 41, an electronic control circuit board 42, an ozone supply tube 43, and a control switch 44. The control switch 44 is disposed on the outside of the ozone generator 4 and adapted to control the operation of the control circuit board 42. The control circuit board 42 controls the operation of the ozone-generating unit 41 and the electromagnetic valve 3. The electromagnetic valve 3 is controlled by the control circuit board 42 to close/open the water intake valve 2. The mixer tube 5 comprises a neck 51 in the middle, and an ozone inlet 52 in the neck 51. The ozone supply tube 43 is connected to the ozone inlet 52 of the mixer tube 5. When water passes through the neck 51 of the mixer tube 5, the flowing speed of water is accelerated, and therefore ozone is quickly filled in the mixer tube 5 and mixed with running water to the desired concentration.

Figure 4:
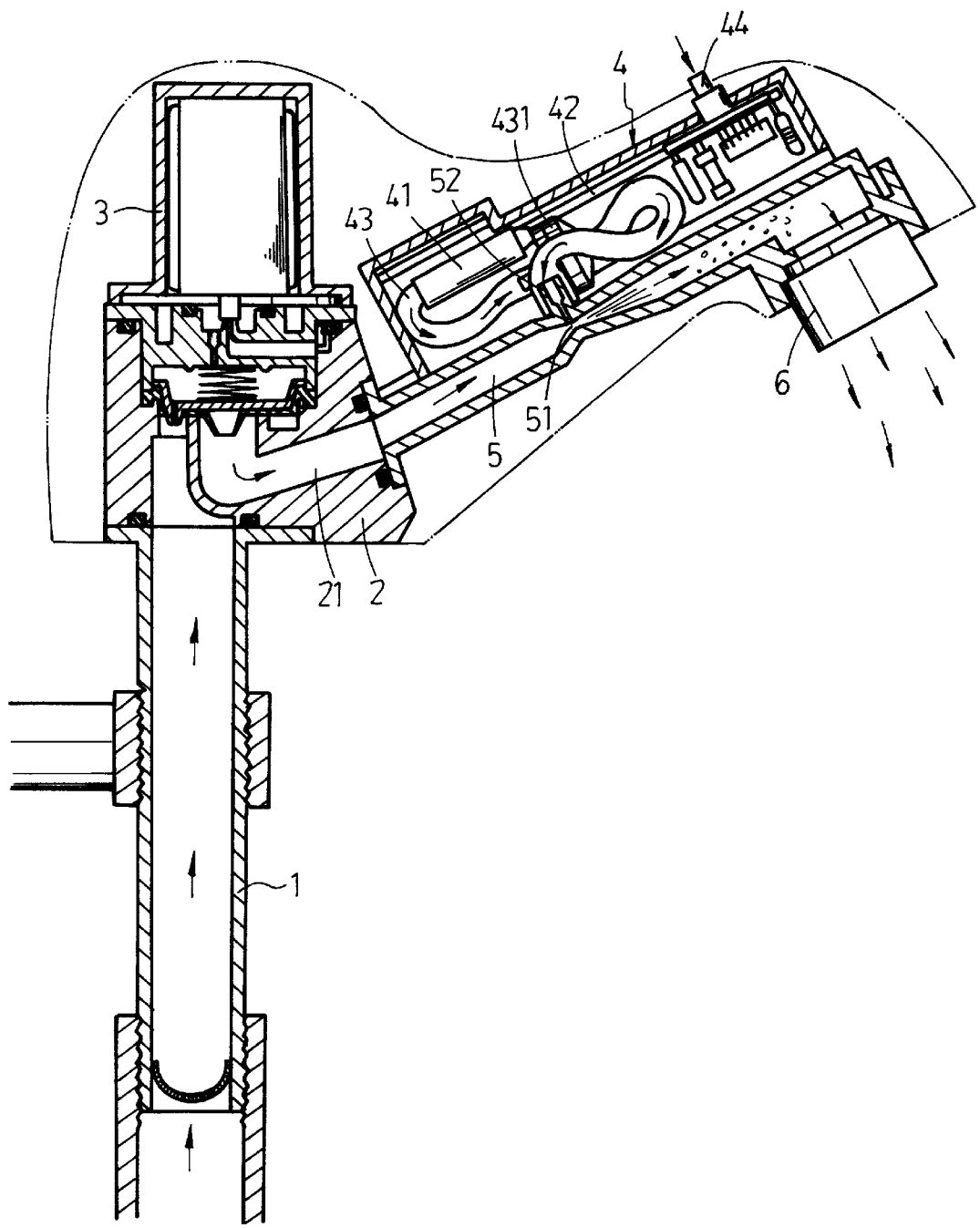
FIG. 4 is a sectional view showing the ozone-generating faucet operated.

Referring to FIG. 4, when switching on the control switch 44, the electromagnetic valve 3 is energized to open the water intake valve 2 for enabling water to flow out of the water supply tube 1 to the spout 6 through the mixer tube 5, and at the same time the ozone-generating unit 41 is started to generate ozone, enabling generated ozone to be delivered through the ozone supply tube 43 to the mixer tube 5 for mixing with water running through the mixer tube 5 to the spout 6. When water runs through the neck 51 of the mixer tube 5, the flowing speed of running water is accelerated, and the pressure of water is relatively increased to produce a significant pressure different between the mixer tube 5 and the ozone supply tube 43, and therefore ozone is quickly sucked into the mixer tube 5 and mixed with water running through the mixer tube 5. Further, in order to stop water from flowing back into the ozone generator 4, a check valve 431 is installed in the ozone supply tube 43.

Figure 5:
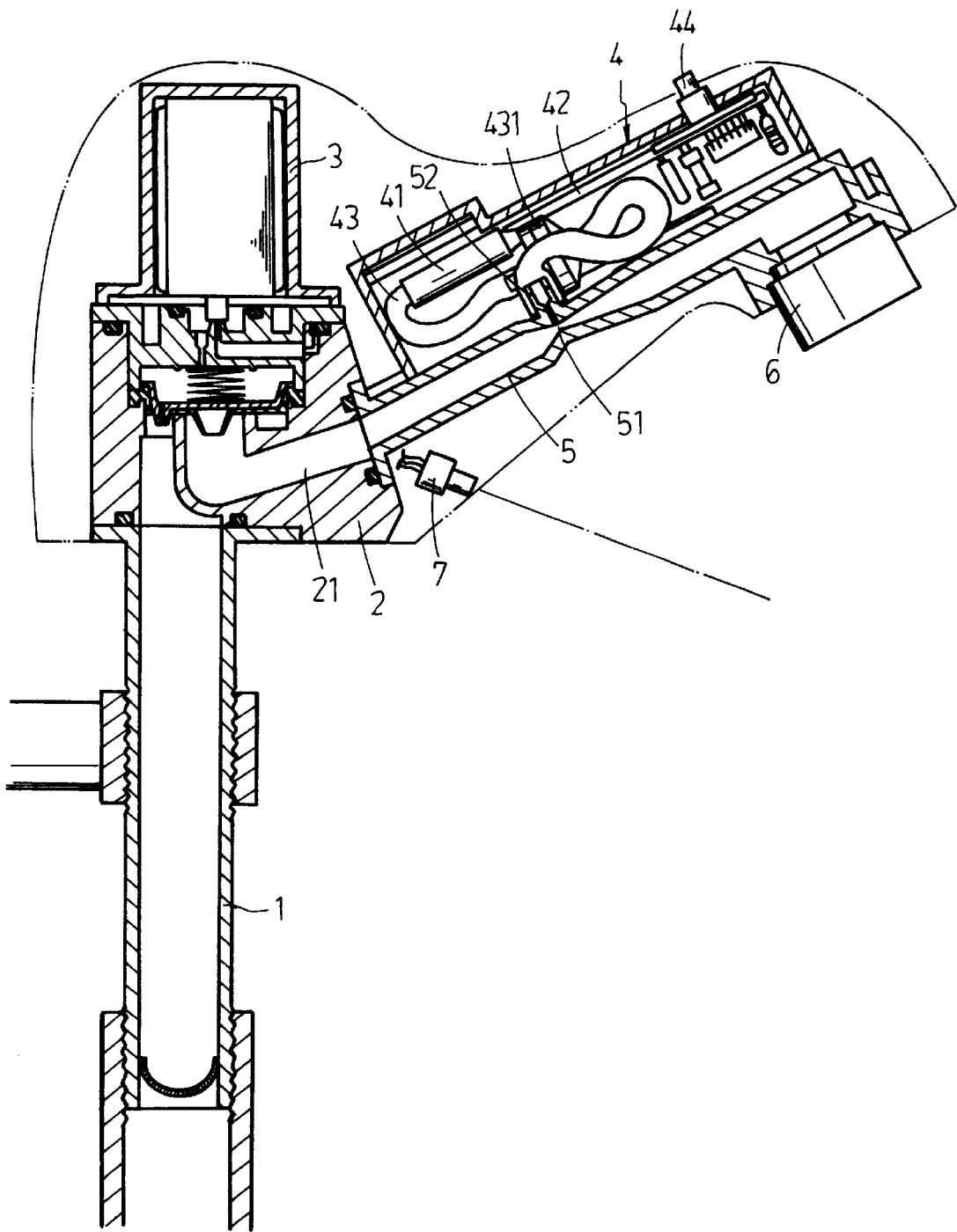
FIG. 5 is a sectional view of an alternate form of the present invention, showing an infrared switch installed in the shell of the faucet between the water intake valve and the mixer tube.
Figure 6:
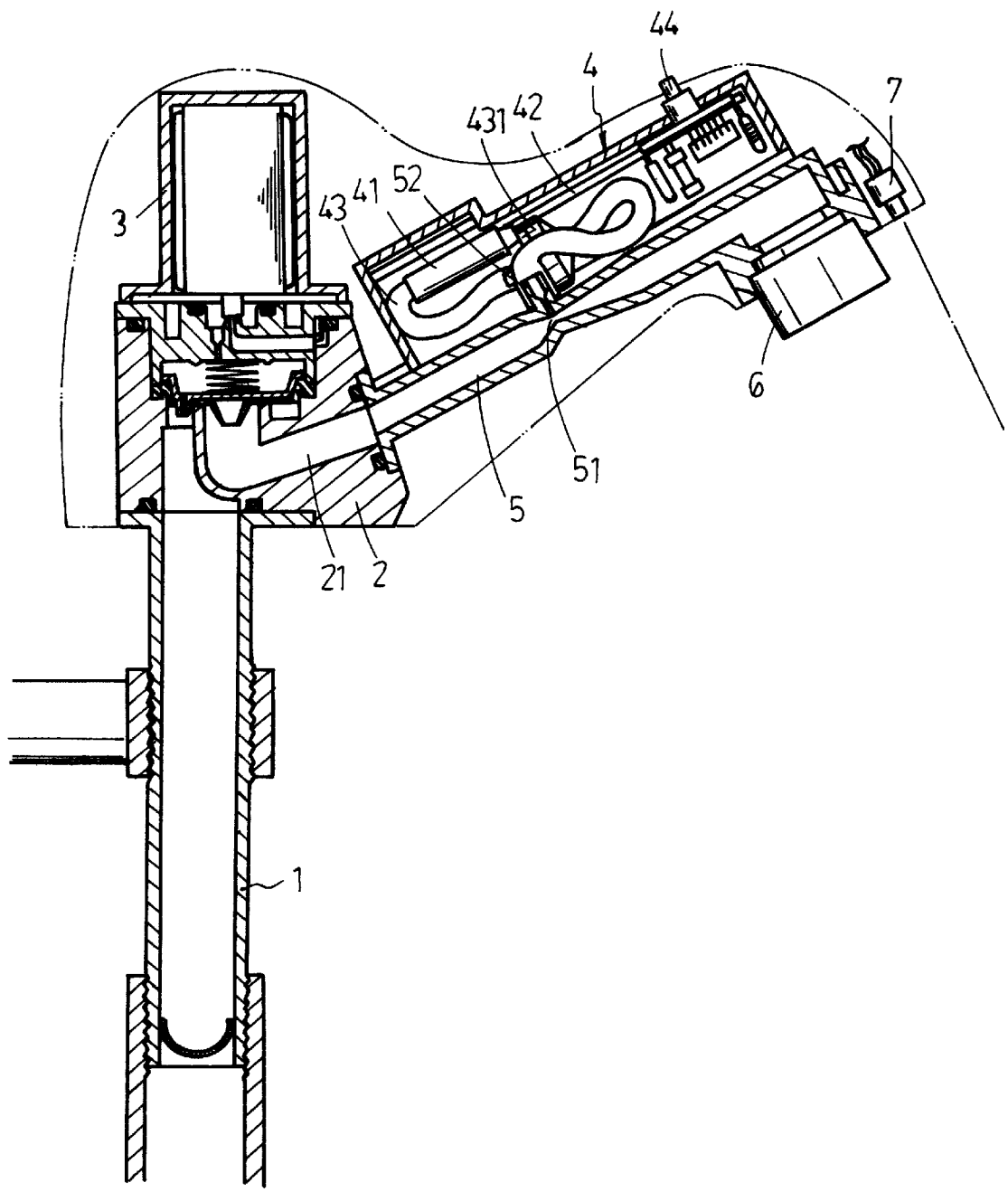
FIG. 6 is a sectional view of another alternate form of the present invention, showing an infrared switch installed in the shell of the faucet adjacent to the spout.

Referring to FIGS. 5 and 6, an infrared switch 7 may be provided and installed in the shell of the faucet at a suitable location to detect the presence of the user's hands and to automatically turn on the electromagnetic valve 3 and the ozone generator 4 upon the presence of the user's hands. In FIG. 5, the infrared switch 7 is installed in the shell of the faucet between the water intake valve 2 and the mixer tube 5. In FIG. 6, the infrared switch 7 is installed in the shell of the faucet adjacent to the spout 6.

A prototype of ozone-generating faucet has been constructed with the features of FIGS. 1~6. The ozone-generating faucet functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. An ozone-generating faucet comprising:
a water supply tube connected to a water source, a water intake valve connected to said water supply tube for output of water from said water supply tube, an electromagnetic valve mounted on said water intake valve and configured to open/close said water intake valve, a mixer tube extended from said water intake valve, said mixer tube having a neck in the middle, and a spout connected to one end of said mixer tube remote from said water intake valve, wherein an ozone generator is mounted on said mixer tube and configured to generate ozone and to supply generated ozone to said mixer tube for mixing with water running through said mixer tube, said ozone generator comprising an ozone-generating unit configured to generate ozone, a control circuit board adapted to control the operation of said ozone-generating unit and said electromagnetic valve, and an ozone supply tube connected between said ozone-generating unit and an ozone inlet in the neck of said mixer tube and configured to deliver generated ozone from said ozone-generating unit to said mixer tube.

2. The ozone-generating faucet of claim 1 further comprising a control switch mounted on a shell of the ozone-generating faucet and adapted to control the operation of said control circuit board in driving said ozone generator and said electromagnetic valve.

3. The ozone-generating faucet of claim 1 further comprising an infrared switch adapted to detect the presence of the user's hands below said spout and to drive said control circuit board to turn on said ozone generator and said electromagnetic valve upon the presence of the user's hands.

4. The ozone-generating faucet of claim 1 wherein said ozone generator comprises a check valve installed in said ozone supply tube to stop mixer tube water from passing to the inside of said ozone generator.

* * * * *